US008086110B2

(12) United States Patent
Watts et al.

(10) Patent No.: US 8,086,110 B2
(45) Date of Patent: Dec. 27, 2011

(54) OPTICAL WAVELENGTH DIVISION MULTIPLEXING (WDM) SYSTEM INCLUDING ADAPTIVE CROSS-TALK CANCELLATION

(75) Inventors: Phillip Watts, Essex (GB); Robert Killey, London (GB); Madeleine Glick, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 1322 days.

(21) Appl. No.: 11/724,633

(22) Filed: Mar. 14, 2007

(65) Prior Publication Data

US 2011/0052211 A1    Mar. 3, 2011

(51) Int. Cl.
*H04B 10/04* (2006.01)

(52) U.S. Cl. ........ 398/194; 398/182; 398/183; 398/195; 398/196; 398/197; 398/198; 398/79; 398/162; 398/33

(58) Field of Classification Search ............... 398/25, 398/33, 161, 158, 182–186, 192–194, 199, 398/187, 188, 189, 195, 196, 197, 198, 200, 398/201, 135, 136, 137, 138, 139, 202, 208, 398/209, 159, 162, 79
See application file for complete search history.

(56) References Cited

U.S. PATENT DOCUMENTS

| | | | | |
|---|---|---|---|---|
| 5,091,905 A | * | 2/1992 | Amada | 370/415 |
| 5,796,501 A | * | 8/1998 | Sotom et al. | 398/59 |
| 7,171,127 B2 | * | 1/2007 | Matsuo | 398/195 |
| 7,613,400 B2 | | 11/2009 | Cheng et al. | |
| 2005/0185546 A1 | * | 8/2005 | Watabe | 369/47.51 |

OTHER PUBLICATIONS

J. Poirrier et al., "Electronic WDM Crosstalk Cancellation," Proc. 27th European Conference on Optical Communication (ECOC '01-Amsterdam), Mo.L.3.5, pp. 94-95.
R.I. Killey et al., "Electronic Dispersion Compensation by Signal Predistortion Using Digital Processing and a Dual-Drive Mach Zehnder Modulator," *IEEE Photonics Technology Letters*, vol. 17, No. 3, Mar. 2005, pp. 714-716.

* cited by examiner

*Primary Examiner* — Hanh Phan
(74) *Attorney, Agent, or Firm* — Blakely, Sokoloff, Taylor & Zafman LLP

(57) ABSTRACT

An optical communication system comprising a transmitter including a data register having a plurality of outputs, each output comprising a separate data channel, a plurality of signal processors, each signal processor corresponding to a data, a plurality of laser modules, each laser module coupled to an output of a corresponding signal processor, wherein each laser module modulates the modified signal from its corresponding data channel onto an optical carrier having a selected wavelength, and an optical multiplexer coupled to an output of all the laser modules. Each signal processor comprises a first input to receive a signal from the corresponding data channel and one or more additional inputs to receive a signal from one or more adjacent data channels, a control input to receive a control signal generated at a receiver based upon a monitored characteristic of the received signal from the corresponding data channel, and logic to modify a characteristic of the signal from the corresponding channel based upon the control signal and the signals from the one or more adjacent data channels.

12 Claims, 3 Drawing Sheets

OPTICAL WAVELENGTH DIVISION MULTIPLEXING (WDM) SYSTEM INCLUDING ADAPTIVE CROSS-TALK CANCELLATION

TECHNICAL FIELD

Embodiments of the present invention relate generally to optical communication systems and in particular to an optical wavelength division multiplexing system including adaptive cross-talk cancellation.

BACKGROUND

Wavelength division multiplexing (commonly referred to as WDM) is a technique used to increase the data-carrying capacity of an optical communication system, or of components such as an optical transmission link (e.g., an optical fiber) within an optical communication system. WDM enables an optical communication system to simultaneously carry multiple streams of data through a single optical transmission link in separate and independent optical channels, thus substantially increasing the system's data capacity. Each channel includes an optical carrier signal operating at a certain optical wavelength. In a transmitter, data is modulated onto each optical carrier signal and the separate optical signals are then multiplexed together and launched into a single transmission link.

Early WDM systems were generally "coarse" WDM systems in which the wavelength spacing between carrier signals was large; in one example of coarse WDM, one carrier signal operates at a wavelength of 850 nanometers (nm), while the next adjacent carrier signal operates at 1310 nm, for a wavelength spacing of about 460 nm. In an effort to transmit ever more data through fewer transmission links, more recent optical systems use "dense" WDM, in which the wavelength spacing between adjacent optical carrier signals is substantially smaller than in coarse WDM systems.

Cross-talk is a phenomenon that occurs in both coarse and dense WDM systems, but is especially problematic in dense WDM systems because of the small wavelength spacing. Cross-talk occurs when power is transferred between an optical carrier signal and an adjacent carrier signal. As a result of this power transfer, a small proportion of the optical power that should have ended up in a particular channel ends up in an adjacent channel, where it creates noise by distorting both the adjacent carrier signal and any data that may have been modulated onto the adjacent carrier signal.

To reduce cross-talk, current dense WDM systems use relatively large and expensive multiplexers and de-multiplexers that are temperature controlled. Coarse WDM systems are less expensive and not temperature controlled, but they allow only a very low number of wavelengths, severely limiting the aggregated bandwidth of the system. Finding alternative methods of reducing cross-talk would allow dense WDM systems to reduce wavelength spacing and would allow the use of cheaper, physically smaller and lower power consumption components.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for adaptive cross-talk cancellation in an optical wavelength division multiplexing system are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics described may be combined in any suitable manner in one or more embodiments.

Figure 1:
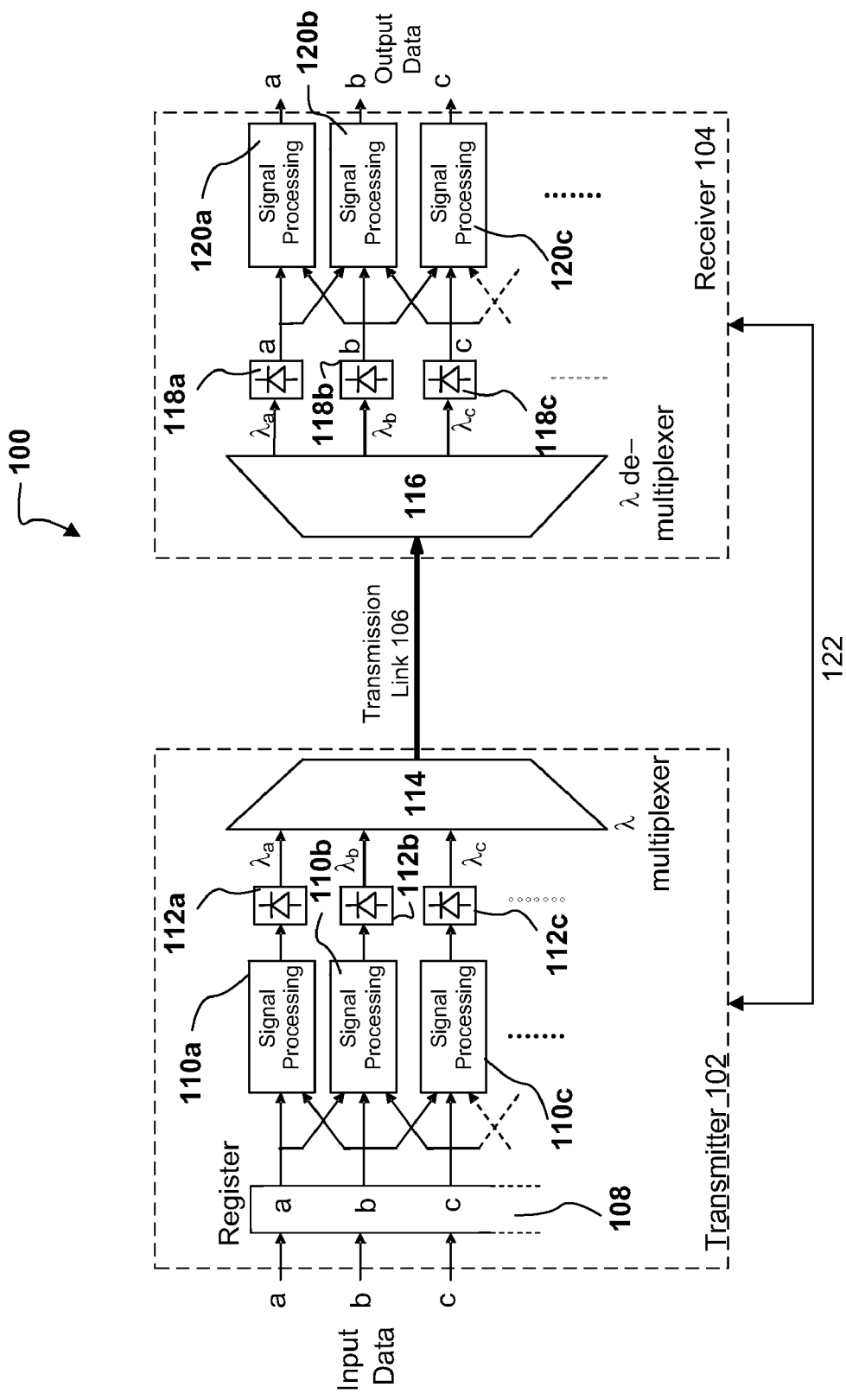
FIG. 1 is a schematic view of an embodiment of a wavelength division multiplexing system.

FIG. 1 illustrates an embodiment of an optical wavelength division multiplexing (WDM) system 100. System 100 includes a WDM transmitter 102 coupled to a WDM receiver 104 by an optical transmission link 106 that carries a multiplexed optical signal between transmitter and receiver. In the embodiment shown, the optical transmission link can be an optical fiber, although in other embodiments optical transmission link 106 can be a free-space optical link, a silicon waveguide, or some other type of optical transmission link.

Transmitter 102 includes a data register 108 coupled to a plurality of signal processors 110a-110c. The output from each signal processor 110a-110c is then coupled to a corresponding laser module 112; thus, the output of signal processor 110a is coupled to laser module 112a, the output of signal processor 110b is coupled to laser module 112b, and so forth. Each of laser modules 112a-112c outputs an optical data signal having a different optical carrier wavelength, and the optical data signals from all the laser modules 112a-112c are inputs into wavelength multiplexer 114. Multiplexer 114 combines the input signals received from laser modules 112a-112c and outputs a multiplexed optical signal that is launched into transmission link 106, through which it travels to receiver 104.

Data register 108 buffers and synchronizes input data before the data is transmitted to the signal processors. Data register 108 includes a plurality of inputs, one for each stream or channel of data to be transmitted, and includes a plurality of outputs, each of which also corresponds to one of the streams of data to be transmitted. The illustrated embodiment shows three inputs corresponding to channels a, b and c, and three outputs corresponding to the three channels. In other embodiments data register 108 can use a greater or lesser number of inputs and outputs, depending on the number of data streams to be transmitted. In addition to providing memory space in which the incoming data streams can be buffered, data register 108 also includes logic and timing circuits to appropriately synchronize the incoming data and process it in parallel.

Each of signal processors 110a-110c corresponds to one of the data channels a-c output by data register 108: signal processor 110a corresponds to channel a, signal processor 110b corresponds to channel b, and so on. The illustrated embodiment shows three signal processors corresponding to the channels a-c output from data register 108, although in other embodiments a greater or lesser number of signal processors can be used depending on the number of channels. In addition to having its input coupled to a corresponding channel from data register 108, each signal processor 110a-110c has its input coupled to at least one adjacent data channel. Signal processor 110b, for example, is coupled to three outputs from data register 108: adjacent channels a and c, and its own corresponding channel b. Signal processor 110a, on the other hand, has its inputs coupled to only two outputs from data register 108: adjacent channel b and its own corresponding channel a.

As used in this application, an "adjacent channel" is one whose signal will be modulated onto an optical carrier having an adjacent wavelength in a WDM scheme. For example, the illustrated WDM system 100 uses three carrier wavelengths $\lambda_a$, $\lambda_b$ and $\lambda_c$. In an embodiment where these wavelengths are in ascending order ($\lambda_a < \lambda_b < \lambda_c$) channels a is adjacent to channel b and channel b is adjacent to both channels a and c, but channel a is not adjacent to channel c. Although WDM system 100 is laid out such that adjacent channels and their associated component are physically next to each other, use of the term adjacent does not mean that one channel and/or its associated component must be next to, or even physically near, its adjacent channel or channels.

Each signal processor 110a-110c includes therein circuitry and logic to process the received signals. Circuitry within each signal processor can include a general purpose processor or application specific integrated circuit (ASIC), memory, input/output controllers, analog-to-digital or digital-to-analog converters, delay circuits, and the like. The logic used to process the received signals can be embodied in software, hardware, or a combination of the two. Where the logic used by the signal processors is embodied in software, the software code can be stored within the signal processors—in a flash memory, for example—or can be stored internally to the signal processor and loaded into the signal processor upon startup of system 100.

A plurality of laser modules 112 is included in transmitter 102 to encode electronic data into optical signals—in other words, to perform an opto-electronic conversion on the data signals. The number of laser modules 112 will generally correspond to the number of signal processors 110, with the input of each laser module 112 coupled to the output of a corresponding signal processor; thus, laser module 112a corresponds to signal processor 110a, laser module 112b corresponds to signal processor 110b, and so forth. Each laser module 112 emits at a wavelength $\lambda$ different than the others, with the spacing between laser wavelengths $\Delta\lambda$. The illustrated embodiment uses three wavelengths $\lambda_a$, $\lambda_b$ and $\lambda_c$. In an embodiment where these wavelengths are in ascending order ($\lambda_a < \lambda_b < \lambda_c$), if the system uses a uniform wavelength spacing $\Delta\lambda$, then $\lambda_b \approx \lambda_a + \Delta\lambda$ and $\lambda_c \approx \lambda_b + \Delta\lambda$. The value of $\Delta\lambda$ will depend on how coarse or dense the wavelength division multiplexing (WDM) is used, and other embodiments need not use uniform wavelength spacing.

Multiplexer 114 is coupled to the outputs of laser modules 112 and combines all the data signals output by the laser modules into a single multiplexed data signal that can then be carried on a single transmission link such as transmission link 106. Multiplexer 114 can be any of various known multiplexers, such as coupler arrays, Littrow gratings, array waveguide gratings, filter arrays, others not listed here and/or combinations of these.

Receiver 104 is coupled to transmission link 106 and receives the multiplexed optical signal transmitted through link 106 by transmitter 102. In one embodiment, receiver 104 can also be coupled to transmitter 102 by a separate link 122 that functions as a control channel and is used to carry a control signal from the receiver to the transmitter. The control channel can provide feedback to the transmitter so that it can adjust and/or optimize its operation in response to some signal characteristic monitored at the receiver. Other embodiments of system 100 can be used in different ways to establish a control channel to carry a control signal. For example, the control channel could be carried through optical transmission link 106 instead of separate link 122, or the control channel could be a wireless RF link.

Receiver 104 includes an optical de-multiplexer 116 with an input that receives the multiplexed optical signal from optical transmission link 106. De-multiplexer 116 includes multiple outputs, each of which is coupled to the input of a corresponding optical detector 118; thus, one output of de-multiplexer 116 is coupled to optical detector 118a, another is coupled to optical detector 118b, and so forth. Each optical detector 118 is coupled to a corresponding signal processor 120, as well as being coupled to at least one signal processor corresponding to an adjacent optical detector.

De-multiplexer 116 includes an input through which it receives the multiplexed optical signal carried by transmission link 106 and a plurality of outputs, each of which corresponds to one of the separate optical signals extracted by the de-multiplexer. De-multiplexer 116 receives the multiplexed optical signal and uses the carrier wavelengths to separate the various signals contained within the multiplexed optical signal. De-multiplexer 116 then outputs the various signals as different channels, each of which has encoded thereon one of the transmitted data streams. Each output from the de-multiplexer is coupled to the input of a corresponding optical detector 118; thus, the output of de-multiplexer 116 corresponding to data channel a is coupled to optical detector 118a, the output corresponding to data channel b is coupled to optical detector 118b, and so forth.

Optical detectors 118 perform an electro-optical conversion on the received optical signals to convert them into corresponding electrical signals. Optical detectors 118 can be any type of optical detector capable of detecting an optical signal at the required wavelength and with the required sensitivity. In one embodiment, all optical detectors 118 can be of the same type, but in other embodiments different types of optical detectors 118 can be combined. Examples of optical detectors that can be used include photoconductors, phototransistors, photodiodes such as P-N diodes, P-I-N diodes, Schottky barrier photodiodes, avalanche photodiodes, hetero-interface photodetectors, traveling-wave photodetectors or resonant-cavity photodetectors. Other optical detectors not listed here can also be used in other embodiments.

Each signal processor 120 includes an input for the corresponding channel from optical detector 118 and one or more additional inputs from photodetectors for one or more adjacent channels. Thus, signal processor 120*a*, which processes data from channel a, is coupled to photodetectors 118*a* and 118*b*, while signal processor 120*b* is coupled to photodetectors 118*a*, 118*b* and 118*c*. Each signal processor 120 includes therein circuitry and logic to process the received signals. Circuitry within each signal processor can include a general purpose processor or application specific integrated circuit (ASIC), memory, input/output controllers, analog-to-digital or digital-to-analog converters, delay circuits and the like. The logic used by signal processors 120 to process the received signals can be embodied in software, hardware, or a combination of the two. Where the logic is embodied in software, the software code can be stored within the signal processors—in a flash memory, for example—or can be stored externally to the signal processor and loaded into the signal processor upon startup of system 100. Additionally, each signal processor 120 includes hardware and/or software to monitor some characteristic of the received signal. Examples of characteristics that can be monitored include signal power, signal-to-noise ratio (SNR), and bit error rate (BER), although other characteristics or combinations of characteristics can be used as well. As it monitors the selected characteristic of the received signal, the signal processor generates a control signal that provides feedback to transmitter 104, or to the signal processor 110 for the corresponding channel. The feedback can be used by the transmitter and receiver to improve and/or optimize the operation of system 100. The feedback signal can also be used by signal processors 120 to adjust the signal at the receiver.

Figure 2A:
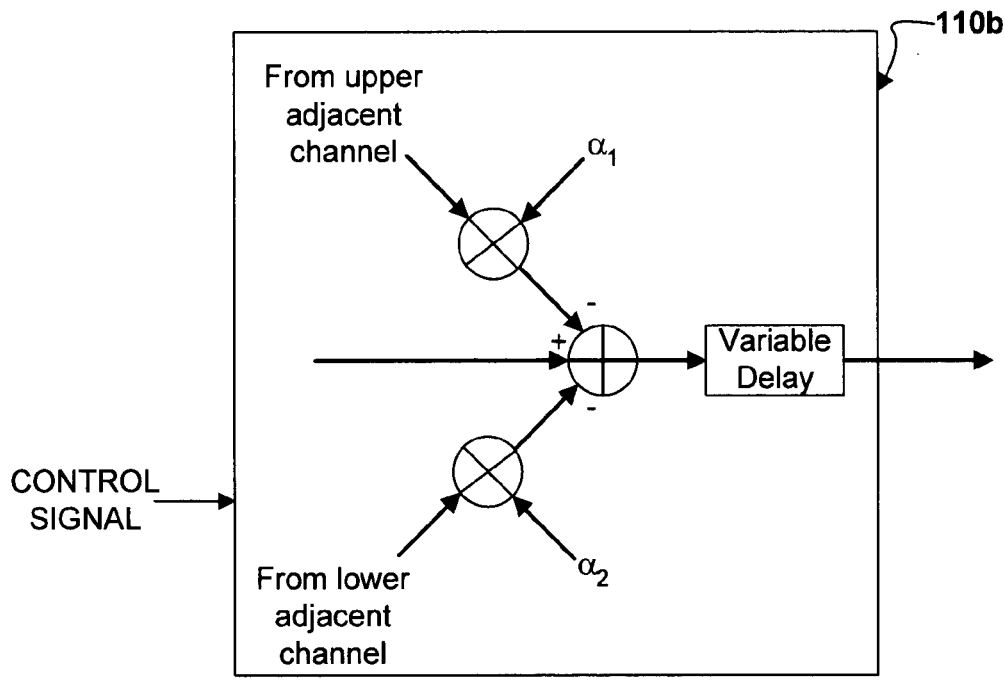
FIG. 2A is a schematic view of an embodiment of a signal processor usable at the transmitter of the wavelength division multiplexing system shown in FIG. 1.
Figure 2B:
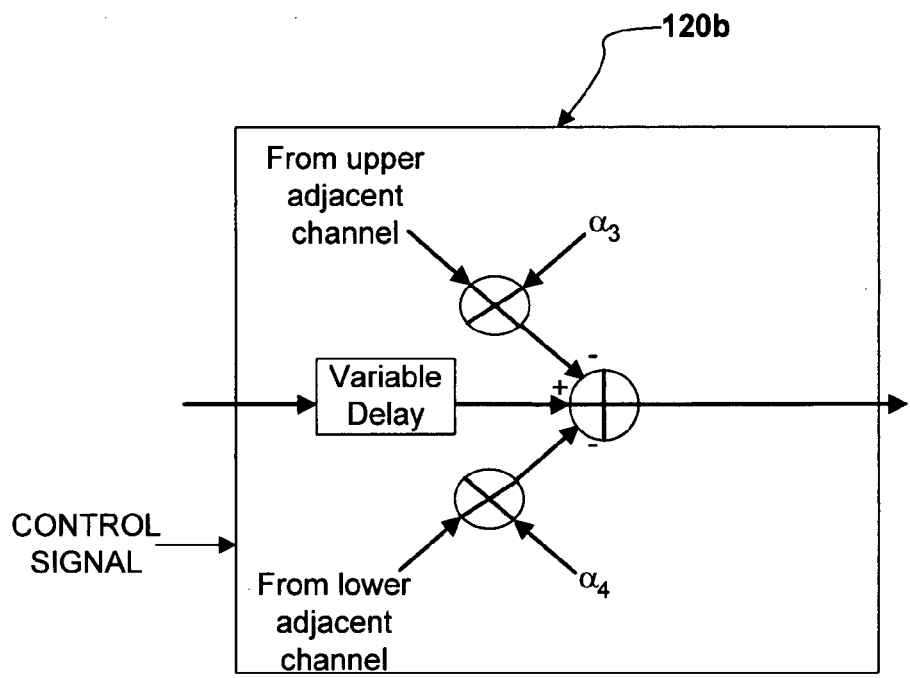
FIG. 2B is a schematic view of an embodiment of a signal processor usable at the receiver of the wavelength division multiplexing system shown in FIG. 1.

FIGS. 2A-2B illustrate embodiments of the operation of a signal processor. FIG. 2A illustrates an embodiment of the operation of logic within signal processor 110*b* at transmitter 102; other signal processors with a different number of inputs, such as 110*a*, operate similarly. Signal processor 110*b* receives inputs from three sources: its corresponding channel b, upper adjacent channel a, and lower adjacent channel c. The logic adjusts some characteristic of the signal channel b (its power, for example) by adding or subtracting a multiple ($\alpha_1$) of the same characteristic from the upper adjacent channel and a multiple ($\alpha_2$) of the same characteristic from the lower adjacent channel. In one embodiment, ($\alpha_1$) and ($\alpha_2$) can have values between −1 and 1, indicating that the characteristic of the corresponding signal is adjusted by a fraction of the signal characteristic from the adjacent channel, while in another embodiment ($\alpha_1$) and ($\alpha_2$) can have values greater than 1 or less than −1, indicating that the characteristic of the signal from the corresponding channel is adjusted by a multiple of the signal characteristic from the adjacent channel. In still other embodiments, ($\alpha_1$) and ($\alpha_2$) need not have the same value, and in some embodiments one can have a value less than one while the other has a value greater than one.

In still other embodiments, the values of ($\alpha_1$) and ($\alpha_2$) can be optimized to minimize the bit error rate (BER) at receiver 104 using a control signal carrying feedback from the receiver. Some characteristic of each signal received at receiver 104—signal power, signal-to-noise ratio (SNR) and bit error rate (BER) are examples of characteristics, although others are possible—can be monitored. Feedback from the monitored characteristic can then be sent over control channel 122 to transmitter 102, where signal processors 110 can adjust the values of ($\alpha_1$) and ($\alpha_2$) to optimize the signal characteristic measured at the receiver. Similarly, data regarding the monitored characteristic can be sent to signal processors 120 within the receiver, where the values of ($\alpha_3$) and ($\alpha_4$) can be adjusted to optimize the signal at the receiver, for example by minimizing the BER.

After the characteristic of the signal from the corresponding channel is modified by each signal processor 110 as described above, a variable delay is introduced into the signal and the signal is the output into multiplexer 114, which then combines the signals output from all signal processors 110 to form the multiplexed signal that is then launched into transmission link 106.

FIG. 2B illustrates an embodiment of the operation of logic within signal processor 120*b* at receiver 104; other signal processors with a different number of inputs, such as 120*a*, operate similarly. Signal processor 120*b* received inputs from its corresponding channel b, upper adjacent channel a, and lower adjacent channel c. The logic adjusts some characteristic of the signal in the corresponding channel (its power, for example) by adding or subtracting a multiple ($\alpha_3$) of the same characteristic from the upper adjacent channel and a multiple ($\alpha_4$) of the same characteristic from the lower adjacent channel. In one embodiment, ($\alpha_3$) and ($\alpha_4$) can have values between −1 and 1, indicating that the characteristic of the corresponding signal is adjusted by a fraction of the signal from the adjacent channel, while in another embodiment ($\alpha_3$) and ($\alpha_4$) can have values greater than 1 or less than −1, indicating that the characteristic of the signal from the corresponding channel is adjusted by a multiple of the signal from the adjacent channel. In still other embodiments, ($\alpha_3$) and ($\alpha_4$) need not have the same value, and in some embodiments one can have a value less than one while the other has a value greater than one. After the characteristic of the signal from the corresponding channel is modified as described above, a variable delay is introduced into each signal to synchronize the bits from all signals and the signal is then output for further processing.

Figure 3A:
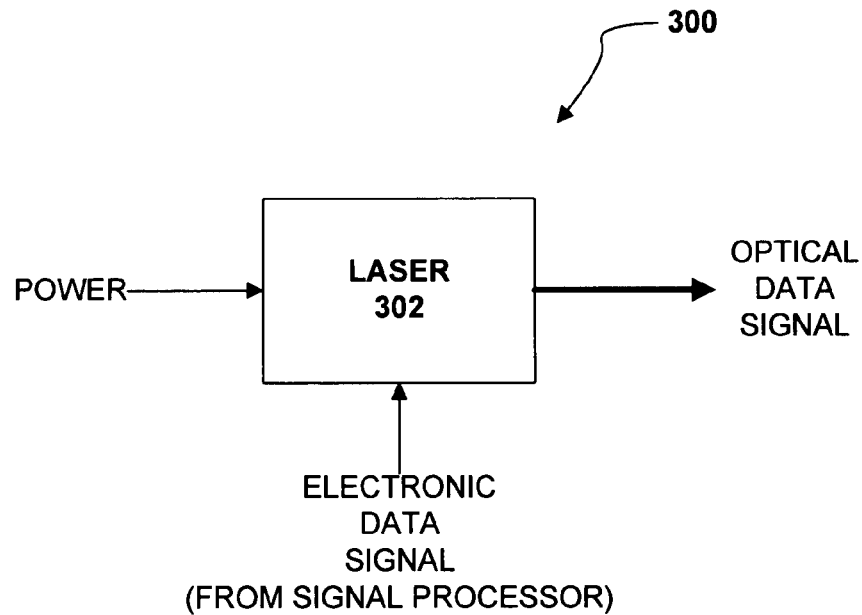
FIG. 3A is a schematic view of an embodiment of a laser module that can be used in the embodiment of a wavelength division multiplexing system shown in FIG. 1.
Figure 3B:
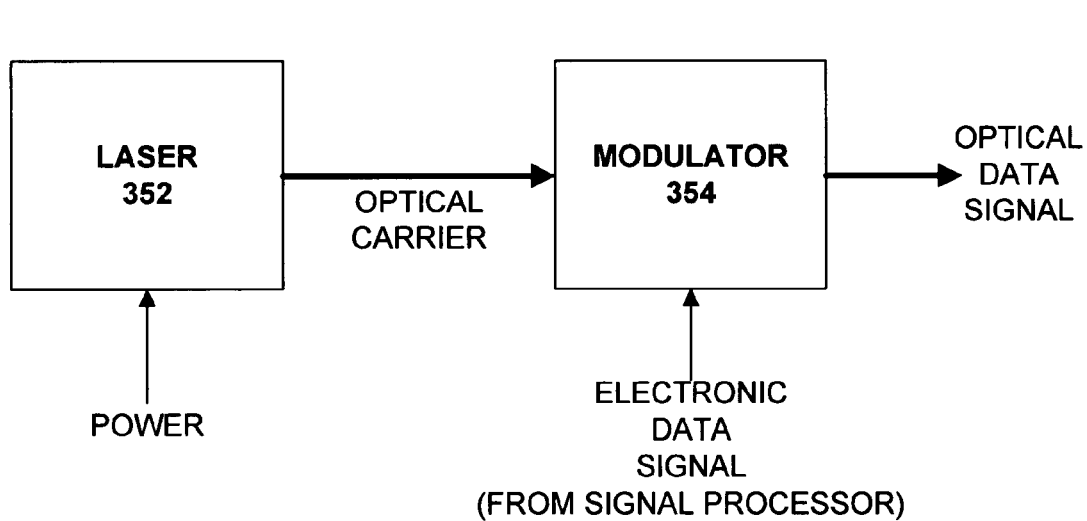
FIG. 3B is a schematic view of an alternative embodiment of a laser module that can be used in the embodiment of a wavelength division multiplexing system shown in FIG. 1.

FIGS. 3A and 3B illustrate embodiments of laser modules that can be used for laser modules 112 in system 100. FIG. 3A illustrates an embodiment of a laser module 300 that includes a laser 302 that is directly modulated, meaning that electrical data signals output from signal processors such as 110 are input directly to the corresponding laser and used to pulse the laser according to some encoding scheme to generate an optical data signal. In different embodiments, laser 302 can be a semiconductor laser diode, a Fabry-Perot laser, a distributed feedback (DFB) laser, a distributed Bragg reflector (DBR) laser, an external cavity DBR laser, an external fiber-cavity DBR laser, a Vertical Cavity Surface Emitting Laser (VCSEL), an in-fiber laser, an upconversion fiber laser, a gas laser, a free electron laser, or some other laser not listed.

FIG. 3B illustrates an embodiment of a laser module 350 that includes a laser 352 that is modulated using an external modulator 354. Power supplied to laser 352 causes it to output an optical carrier signal at the required wavelength. The optical carrier signal is directed through the external modulator, which received the data signal from the corresponding channel in electronic form then superimposes the data onto the optical carrier signal. Laser that can be used include all the lasers described above for laser module 300. Modulators that can be used in different embodiments include electro-absorption modulators, acoustic modulators, acoustic tunable filters, phase modulators, Mach-Zender interferometers, Pockels cell modulators and Faraday effect modulators, or combinations of those listed. Other modulators not listed here can also be used. Different embodiments of transmitter 102 need not use the same type of modulation for all channels—that is, some data laser modules can use direct modulation, while others can use external modulation.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An optical communication system comprising:
   a transmitter including:
      a data register having a plurality of outputs, each output comprising a separate data channel;
      a plurality of signal processors, each signal processor assigned to a corresponding data channel and each signal processor comprising:
         a first input to receive a signal from the corresponding data channel and one or more additional inputs to receive a signal from one or more adjacent data channels,
         a control input to receive a control signal generated at a receiver based upon a monitored characteristic of the received signal from the corresponding data channel, and
         logic to modify a characteristic of the signal from the corresponding data channel based upon the control signal and the signals from the one or more adjacent data channels;
      a plurality of laser modules, each laser module coupled to an output of a corresponding signal processor, wherein each laser module modulates the modified signal from its corresponding data channel onto an optical carrier signal having a selected wavelength; and
      an optical multiplexer coupled to an output of all the laser modules.

2. The system of claim 1 wherein the logic modifies the characteristic of the signal from the corresponding data channel by adding or subtracting a multiple of the same characteristic of the signals from the one or more adjacent channels.

3. The system of claim 2 wherein the multiple is between −1 and 1 or is greater than 1 or less than −1.

4. The system of claim 3 wherein the logic adds or subtracts a variable delay to the signal in the corresponding data channel.

5. The system of claim 1, further comprising a receiver including:
   an optical de-multiplexer coupled to the optical multiplexer by an optical transmission link, wherein the de-multiplexer includes an output for each data channel;
   a photodetector coupled to each output of the de-multiplexer; and
   a signal processor corresponding to each photodetector, each signal processor comprising:
      a first input to receive a signal from the corresponding photodetector and one or more additional inputs to receive a signal from one or more adjacent photodetectors,
      a control signal generator to generate a control signal based upon a monitored characteristic of the received signal from the corresponding data channel, and
      logic to modify a characteristic of the signal from the corresponding channel based upon the control signal and the input from the one or more adjacent photodetectors.

6. The system of claim 5 wherein the optical transmission link is an optical fiber, a free-space optical link, or a waveguide.

7. The system of claim 5 wherein the control signal is carried by the optical transmission link.

8. The system of claim 5 wherein the logic adds or subtracts a variable delay to the signal in the corresponding channel.

9. A process comprising:
   receiving a corresponding data signal from a corresponding data channel and one or more additional signals from one or more adjacent data channels;
   receiving a control signal, the control signal being generated at an optical receiver based upon a monitored characteristic of the received corresponding data signal;
   modifying a characteristic of the corresponding data signal based upon the control signal and the signals received from the one or more adjacent data channels; and
   transmitting the modified corresponding data signal to a laser module for conversion into an optical signal at a selected optical carrier wavelength.

10. The process of claim 9 wherein modifying the characteristic of the corresponding data signal comprises adding or subtracting a multiple of the same characteristic of the one or more adjacent channels.

11. The process of claim 10 wherein the multiple is between −1 and 1 or is greater than 1 or less than −1.

12. The process of claim 10, further comprising adding or subtracting a variable delay to the signal in the corresponding data channel.

* * * * *